(12) United States Patent
Nelson (10) Patent No.: US 6,267,202 B1
(45) Date of Patent: Jul. 31, 2001

(54) ELEVATION PLATFORM

(76) Inventor: Rick J. Nelson, 12901 N. MacArthur Blvd., Oklahoma City, OK (US) 73142

( * ) Notice: Subject to any disclaimer, the term of this patent is extended or adjusted under 35 U.S.C. 154(b) by 0 days.

(21) Appl. No.: 09/416,507

(22) Filed: Oct. 8, 1999

Related U.S. Application Data (60) Provisional application No. 60/103,746, filed on Oct. 9, 1998.

(51) Int. Cl.$^7$ ..................................................... E04G 3/00
(52) U.S. Cl. ........................... 182/187; 182/135; 182/116
(58) Field of Search ..................................... 182/187, 188, 182/116, 135, 136; 297/452.64; 5/190, 191

(56) References Cited

U.S. PATENT DOCUMENTS

| | | | |
|---|---|---|---|
| 1,030,481 | * | 6/1912 | Palmer . |
| 1,963,347 | * | 6/1934 | Boothe ........................................ 5/190 |
| 2,726,713 | * | 12/1955 | Turner .............................. 297/452.64 |
| 3,165,356 | * | 1/1965 | Geier .......................................... 5/190 |
| 5,052,516 | * | 10/1991 | Jamieson ................................ 182/135 |
| 5,704,690 | * | 1/1998 | Schwartz ........................... 297/452.64 |
| 5,791,436 | * | 8/1998 | Talley ...................................... 182/187 |
| 5,878,451 | * | 3/1999 | Lumine ............................. 297/452.64 |
| 5,921,348 | * | 7/1999 | Louk ....................................... 182/187 |
| 5,993,337 | * | 11/1999 | Janes ...................................... 473/539 |

* cited by examiner

*Primary Examiner*—Alvin Chin-Shue
(74) *Attorney, Agent, or Firm*—The Law Office of Joan I. Norek; Joan I. Norek

(57) ABSTRACT

A treestand platform is strung in a manner at least similar to the stringing of a sports racket, such as a tennis racket, and a treestand having such a platform. The platform might comprise a peripheral frame supporting and delimiting a tension surface formed by a plurality of crossed string sections. The strung surface may be sufficiently resilient to yield very slightly under load, but is sufficiently tenacious that such slight yielding occurs without breakage or permanent deformation. The stringing provides a platform that is both strong and lightweight. The stringing also provides a platform that has a downward visibility comparable to transparency, and which is substantially noiseless during treestand transport, assembly, erection and use, and any other handling.

6 Claims, 7 Drawing Sheets

ELEVATION PLATFORM

This application claims benefit of provisional application 60/103,746, filed Oct. 9, 1998.

BACKGROUND OF THE INVENTION

Devices commonly referred to as "treestands" (or "trees stands" or "stands") are outdoor elevated or aerial observation platforms. They are typically used for wildlife observation, photography, hunting and the like outdoor recreation activities during which it is desirable to be undetected by wildlife. Such structures are also useful for law enforcement and wildlife management purposes.

A fundamental reason for the development and use of stands is to permit a person to be positioned in close range to wildlife forms that would flee or bolt when the presence of a human or unfamiliar element in the locale is detected. When a stand is used, a person seeks to have wildlife approach him, rather than attempting to trail or track down the wildlife. Getting above an animal's line of sight hinders visual detection. An elevated position also hinders odor and motion detection.

Another reason for the development and use of treestands is the visual advantages realized when perched in an elevated position above the ground. The topography of, and the foliage and other obstructions in, the vicinity do not block the view when one is positioned above them.

A like set of principles makes treestands valuable for non-recreational uses such as law enforcement and wildlife management An elevated position for non-recreational uses also deters detection and enables an enhanced visual observation of the region.

The height at which a treestand is elevated depends on various factors, for instance the tree or other structure selected (particularly when using a climbing stand which cannot circumnavigate limbs branching off the main trunk), manual labor and/or safety considerations (particularly when a stand must be pulled up to the mounting position), inherent limitations of the stand (particularly when using a ladder stand with a set height) and the like. The reasonable minimum and maximum height elevations of course have practical utility limits; a person does not want to be positioned either too low or too high for the purposes that brought him out to the region. To achieve at least some degree of imperceptibility to life forms on the ground, a minimum height of about five or six feet, as measured at the platform component, might be reasonable. For hunting, particularly hunting high-strung or jittery game such as deer, a desirable height might be no less than about ten or fifteen feet, measured at the standing platform. (A fifteen foot minimum elevation reduces the possibility of being within a deer's direct line of sight when the deer is approaching from a distance.) For wildlife viewing with little or no vision enhancement equipment, or for instance for hunting with range-limited weapons, a maximum height of about twenty-five or thirty feet, as measured at the platform for standing, might be reasonable. For wildlife observation, photography or management purposes, or for law enforcement purposes, a maximum height of about forty or fifty feet, measured at the standing platform, might be reasonable, particularly when using vision enhancement equipment such as strong binoculars or telescopes, or long range photography equipment. The elevation height desired also may be influenced by comfort and security considerations; the actuality and/or perception of risk to physical safety is of course increased with height.

Treestands are sometimes classified as portable, semi-permanent and permanent. Although the lineations between these categories are not always distinct, the categories provide a proximate indicia of how transportable and mobile a given stand will be, and whether a stand is designed for frequent or infrequent movement. Generally a semi-permanent use of a stand is considered to be the erection of the stand in a single place for an entire season, such as a hunting season, and then its removal at the season's end. A portable stand is moved about from site to site more frequently. A permanent stand is one that is left in place longer, for instance a plurality of years or even the duration of the stand's useful life. Permanent or semi-permanent use obviously can be made of at least some "portable" stands, and at least some people will choose to use a "semi-permanent" or even "permanent" style treestand as a portable stand. Thus the terms "portable", "semi-permanent" and "permanent" as used hereinafter each respectively include both stands designed for such use and those actually so used regardless of their design, unless expressly indicated otherwise.

The weight and handling ease of a portable treestand are extremely important factors. Some portable treestands are moved daily, and even moved in and out of an area once or more in a given day. The weight and handling ease of any treestand, even a semi-permanent and a permanent stand, is also very important if the stand must be carried or packed any significant distance. Since desirable sites for setting up treestands are often in remote areas, and normally in forested, wilderness or other secluded areas, even a permanent treestand might be packed or manually carried a far distance. Further, a person equipped solely with a semi-permanent style of stand, for instance, might encounter situations when it is desirable or necessary to move the stand repeatedly. Such a situation could arise when using a stand in a restricted area in which there is a limit to the time a stand can be left in place.

A treestand is preferably as noiseless as possible when being carried, when being erected and when in use. The advantages of an elevated position are seriously forfeited if the stand's noise alerts wildlife of the person's presence or otherwise alarms wildlife in the area into flight.

A typical treestand includes a platform upon which the user can stand upright. A platform normally will extend out from the tree or other structure on which the stand is mounted in an at least proximate horizontal orientation. The platform must securely hold the weight of at least one person and his equipment and supplies, such as photography or hunting equipment, and often heavy gear such as hiking or hunting boots. The platform should provide sound footing, particularly when the user shifts positions and directional orientation. The platform should be large enough, and have sufficient surface area, for the intended activity. Another desired platform characteristic is "transparency" or at least some degree of "viewability"; the ability of a user to see through the platform to the area directly below is highly desirable. The characteristics of load strength, low weight, and noiselessness have not heretofore been conjoined in a treestand platform. In addition, while some platforms provide a degree of downward viewability, it is believed that heretofore downward viewability at least approaching transparency has not been achieved in any commercial treestand except possibly some of the treestands having relatively heavy weight metal mesh platforms.

Treestands often, but not always, provide some type of seating structure in addition to the platform for standing. Such a seat furnishes a degree of comfort during a long waiting period while perched on a treestand. A treestand seat is normally mounted or otherwise positioned above the platform and in at least partial vertical alignment therewith.

Treestands commonly known as climbing stands include or can be associated with a climbing assist means for scaling a tree or other columnar structure. The tree-scaling features of climbing stands facilitate moving them from site to site. Climbing stands permit a person and the stand to ascend a tree as a combination. As a first example, in a stand that has a second tree surround sector attached to the platform, after securing a stand's tree surround section to the tree, a person secures the platform to his feet, for instance by placing his feet into loops or stirrups attached thereto, stands up on the platform (which is supported independently on the tree via its separate tree surround), and raises the seat together with the tree surround sector. The stand's tree surround sector affixes the upper portion of the treestand mainframe, including the seat, at that higher position. The person then sits down on the seat, and raises their feet together with the attached platform. The lower portion of the treestand mainframe, including the platform, is affixed at its new position via the second tree surround sector, enabling the person to once again stand on the platform and raise the seat further. Instead of attaching a second tree surround sector to the platform, a separate climbing aid operated with one's feet can be used in a similar manner, the person standing on the climbing aid when lifting the stand, and sitting on some stand component while raising the climbing aid with his feet. Another variation is "hand climbing" using a climbing aid operated with one's hands, a process is somewhat the reverse of "foot climbing." In any instance, the series of maneuvers (commonly referred to as the "stand up - sit down" or "inchworm" method) is repeated until the desired height is attained, and is reversed when descending. Climbing treestands ease the effort of getting both the treestand and the user up a tree or other columnar structure, and they typically are fairly heavy, for instance weighing between about 20 and 35 pounds. Any weight reduction of a given model of climbing stand without loss of structural integrity would be enormously advantageous.

Climbing stands can be used as portable, semi-permanent or permanent stands. Once the user and stand climb the tree or structure together, the eventual descent of the user can be with or without the stand. Portable ladders and other aids, such as tree steps (a plurality of single "rungs" screwed into the tree or other structure at varying heights), are well known for descending from and ascending to a mounted stand.

Fixed-position stands, also known as "hang ons", are carried up to the desired height, or pulled up after the user climbs the tree. They are then mounted on the tree or the like via a chain, a strap, a pin mount or other suitable attachment means. Many conventional fixed-position stands weigh between six and fifteen pounds, although larger stands with platform sizes up to about 30-by-30 inches and weighing up to about 30 or 35 pounds or more are commercially available.

Fixed-positioned stands can also be used as portable, semi-permanent or permanent stands. Since carrying or pulling a fixed-position stand up a tree or the like is strenuous, the heavier stands, for instance stands over twelve pounds in weight, are not considered the most suitable for portable use or frequent transport. Regardless of how frequently this type of stand is moved, the manual mode of elevating these stands, and securing them in mounting position, makes a weight reduction in any model an enormous advantage.

Stands that are outfitted or equipped with an integrated ladder-type component for climbing up and down from the stand's platform are commonly called ladder stands. These are typically designed to be assembled on the ground and then propped up against, and strapped or chained to, a tree or other structure. The ladder component also normally is attached to the platform at its "outboard" edge, that is the edge opposite the one set adjacent the tree or other structure, and functions as a support leg (or forked support leg), bearing some of the weight of the stand, the user and his equipment. A typical ladder stand will position the platform at no more than about a twelve foot elevation, and possibly a few feet higher with an extension component. The height limitations of ladder treestands are offset by the simplicity of ascent and descent provided by a ladder stand. Most ladder stands are intended for permanent or semi-permanent use and weigh considerably more than 20 pounds, even up to 30 pounds or heavier, although some as light as fifteen pounds are commercially available. Comfort and/or security can be sacrificed when the lower weight is achieved through the omission of elements; for instance, some ladder stands have no seating means. A weight reduction in a ladder stand, even one used exclusively as a semi-permanent or permanent stand, would be beneficial. As mentioned above, even permanent stands normally need to be trekked a considerable distance to the desired site. In addition, the on-site assembly and the propping up of these stands would be less demanding if a given model was lighter.

Self-supporting treestands are commonly tripod or quad-pod stands. They range from about eight to sixteen feet in height, measured at the platform. They can be used in areas that lack suitable trees or other appropriate support structures. These stands have three or more support legs that typically are splayed down and out from an elevated platform on which is usually mounted a swivel chair or other type of seat. One of the support legs often is a ladder-type component. A concealing blind oftentimes can be attached to rails or otherwise mounted on the platform element, which is particularly useful when these multi-legged treestands are used out in the open, away from any concealing foliage. Such multi-legged treestands normally weigh between about 50 and 150 pounds.

The above enumeration of treestand types is exemplitive only of typical models currently on the market, and their general structural and use classifications.

Both aluminum and steel treestands are commercially available. Steel stands are stronger and more rigid than aluminum stands, and also heavier. Fiber and resin composites are generally considered to be materials that could provide a combination of low weight and high strength and rigidity, but which are generally too costly for the present treestand market. Weight reduction in any model of treestand is normally desirable, particularly if the reduction is achieved without loss of strength, load-carrying and comfort characteristics.

Some treestand models, for instance light-weight models of treestands, would also be improved by an increased structural integrity and/or load capacity and/or comfort, even if such advantage(s) were achieved with little to no overall weight decrease.

Conventional treestands include a platform. Platform elements of treestands are typically used to support a person in a standing position, but their actual and/or intended use need not be limited thereto. Platforms on current commercial treestands typically range in surface area from about 17 inches by 17 inches up to about 24 inches by 42 inches, although smaller platforms, for instance 12 inches by 19 inches, are available commercially, and so probably are larger platforms. Larger platforms are roomier and more comfortable to the user when in use, but their weight is a distinct discomfort factor when moving the stand. The size and weight of treestand platforms are also related to multiple, and often polar, security and safety considerations, discussed below.

A treestand platform is a primary load-bearing element. It must hold up under the weight of the user and his or her equipment, which could well exceed 250 or even 300 pounds. It must hold up under a dynamic weight because the user is well expected to shift positions and directional orientations during use. It must also hold up when that weight is set on its front or forward section, which normally is extended out beyond its support components (discussed in detail later herein). For strength, one might select steel, for instance, over a lighter aluminum fabrication, but the weight of a steel platform makes a serious contribution to the overall stand-weight problem. And even aluminum platforms make serious contributions to the overall treestand-weight problem. A reasonably roomy, partially open cross-ribbed aluminum platform, for instance one having an 18 inch by 23 inch surface, will weigh about five or six pounds, despite its weight-saving ribbed construction. Even such a light-weight platform constitutes about 20 to 24 percent of the overall weight of a twenty-five pound treestand, and about 25 to 30 percent of the overall weight of a twenty pound stand. A solid aluminum platform of like dimensions would be much heavier. And any version would be heavier still if it were made of steel.

An obvious way to reduce the weight of the platform in any treestand model is merely by reducing its size. A size reduction, however, would sacrifice comfort, and probably sacrifice the actuality and perception of safety and security that is found in stands having larger platforms.

Many platforms of commercial stands are open-work platforms, that is, they are formed with ribs, slats or rods (such as the cross-ribbed platform mentioned above), or various metal meshes, held within perimeter frames. The discontinuous surfaces of these open-work platforms provide weight-saving advantages, but that weight-savings is still far less than desired. The discontinuous surfaces also provide some degree of downward viewability. The ability to see downward, through the platform, is very important because an animal silently approaching, and halting directly under a treestand, is not an uncommon occurrence. Hunters, photographers and wildlife enthusiasts alike will probably miss seeing such an animal until it is in flight, unless he or she is able to see downward, directly through the platform.

In more detail, cross-ribbed platforms provide some downward viewability, but their rods or slats still significantly obstruct downward visibility. The limited downward visibility, and the weight-savings, of a cross-ribbed construction has a price. Ribbed or slatted platforms do not provide the secure feeling and comfort of a more solid flooring. Their open spaces are, and/or might at least be perceived to be, security and safety risks. Objects can fall through or be caught between the slats or rods, events which easily lead to rapid, but unthinking and risky, retrieval and/or yanking actions. And the open spaces lead to the same type of exposure discomfort many people experience on ladders and fire escapes and the like. The rods or slats also can be very uncomfortable underfoot, especially during prolonged standing periods.

Metal mesh platforms that have rather small holes or perforations may have less security and safety problems than cross-ribbed platforms, because few objects could fall through or be caught. In addition, they will not create much of an exposed feeling. Metal mesh platforms of that type, however, do not provide any more than a very vague and obscure shadow view of the ground directly below, while providing little weight-savings.

The weight of a treestand platform, and the weight of the stand in its entirety, are important. A lighter stand can ease the burdens accompanying the transport and on-site handling of the treestand. Possibly at least as consequential, however, is a treestand's potential for frustrating a primary goal of the excursion, which is to have wildlife approach the selected location. The degree of concealment acquired by being perched up on a treestand may well be a wasted effort if getting there was noisy, or if being there is noisy. Metal platforms are noisy. They are welded or contain rivets and the like. Metal upon metal is noisy. Most anything striking or knocking against metal is noisy. They will make snapping, popping and creaking noises when in use, particularly when wildlife is spotted and the user stands, turns, shifts his weight and the like. They are noisy when the user drops or places an object down upon them. They also contribute significantly to the overall noise emanating from the treestand when it is being erected, and when a person is climbing into it, and when it is being carried or packed to the site. The chances of spotting wildlife can be destroyed by this noise during the wait, or even before the wait begins.

BRIEF SUMMARY OF THE INVENTION

The present invention is an elevation or treestand platform that is strung in a manner at least similar to the stringing of a sports racket, such as a tennis racket, and a treestand having such a platform. The present invention is an elevation or treestand platform comprising a peripheral frame supporting and delimiting a tension surface formed by a plurality of string sections, particularly crossed string sections, and a treestand having such a platform. The strung surface might be sufficiently resilient to yield very slightly under load, but is sufficiently tenacious that such slight yielding occurs without breakage or permanent deformation. The stringing provides a platform that is both strong and light-weight. The stringing also provides a platform that has a downward visibility comparable to transparency, and which is noiseless during treestand transport, assembly, erection and use, and any other handling.

DETAILED DESCRIPTION OF THE INVENTION

Figure 1:
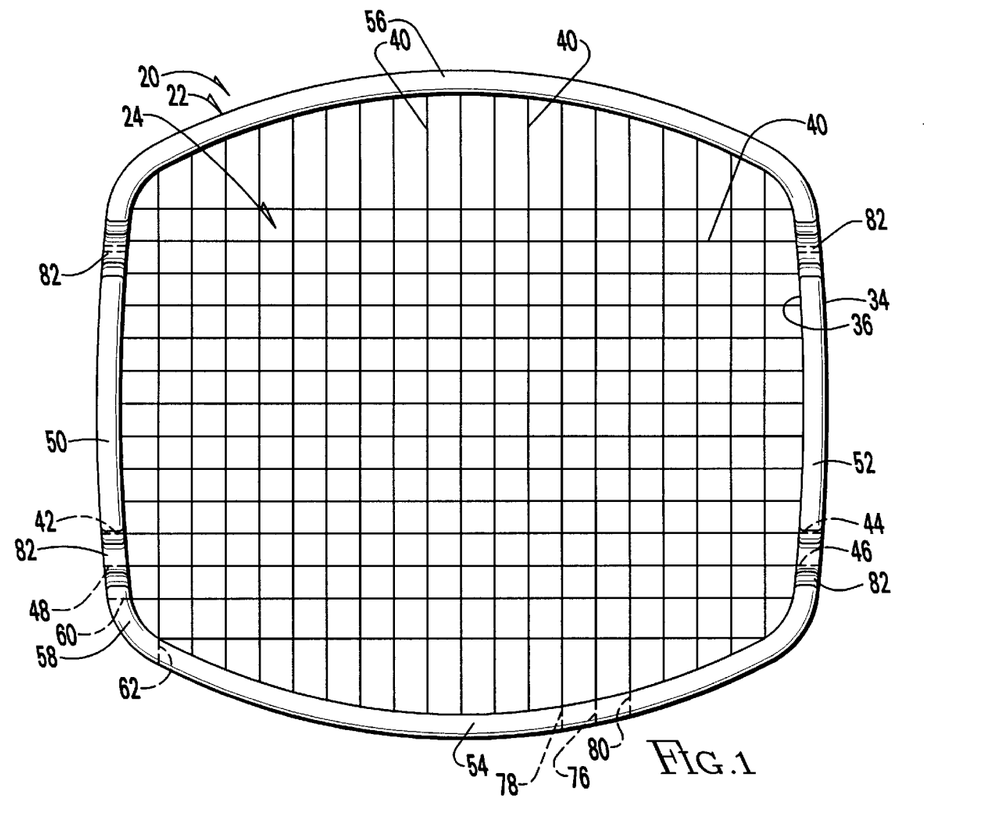
FIG. 1 is a plan view of a platform of the invention.
Figure 2:
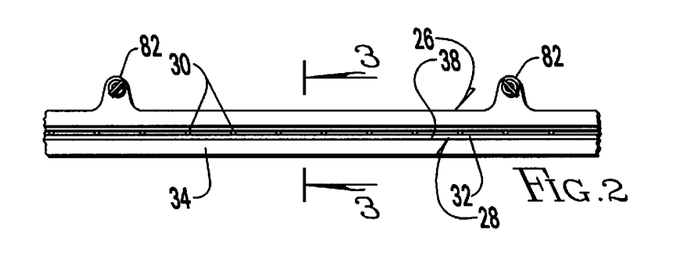
FIG. 2 is a partially-diagrammatic side elevation view of the platform of FIG. 1.
Figure 3:
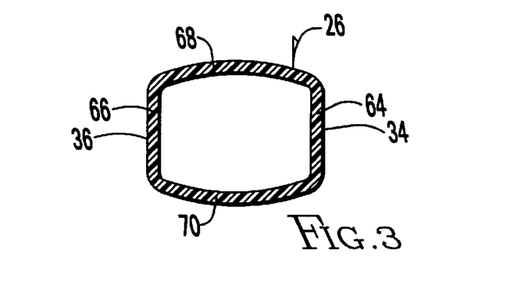
FIG. 3 is an enlarged section view of the platform of FIG. 1, taken along section line 3—3 of FIG. 2.
Figure 3A:
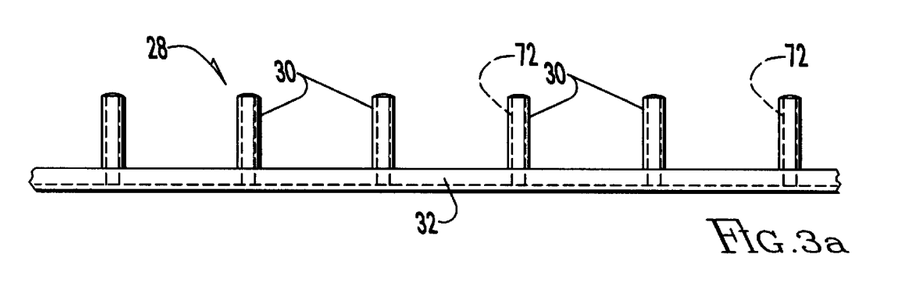
FIG. 3a is a side view of a section of a grommet stripe component of, but not as affixed on, the platform of FIG. 1.
Figure 3B:
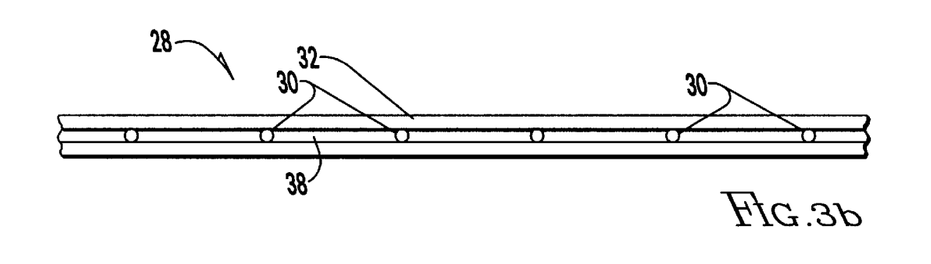
FIG. 3b is a plan view of a section of a grommet stripe component of, but not as affixed on, the platform of FIG. 1

Referring to FIGS. 1 to 3, there is shown a treestand platform 20 of the present invention having a continuous circumferential or perimeter frame 22 supporting and delimiting a strung or tension surface 24. The strung surface 24 is comprised of an open network formed by a plurality of crossed string segments, and more particularly interlaced string segments running from side-to-side of the frame 22. The frame 22 is comprised of a frame body 26 banded or girdled by a flexible but substantially nonelastic grommet strip or stripe 28. The grommet stripe 28 is comprised of a plurality of grommet elements 30 set at intervals along an elongated band element 32. The frame body 26 is perforated by a series or succession of apertures (not shown) that extend from its outer side face 34 through to its inner side face 36. The grommet elements 30 of the grommet stripe 28 extend through and slightly beyond such apertures, and are seated or sheathed therein. The reasonably tight banding of the grommet stripe 28 around the frame body 26 keeps the grommet elements 30 in the frame-body apertures, and the grommet elements 30, buried or embedded in the apertures, act as detent elements, locking or fixing the grommet stripe 28 in place along about the middle line of the outside face 34 of the frame body 26. The grommet elements 30 bush and size the apertures, their casing apertures or eyelets protecting against string/frame-body contact and abrasion, and also guiding the strings. The grommet stripe 28 also includes a centered guide groove 38.

In more detail, the strings of the stringing in this embodiment are two pieces or sections of monofilament that are separately strung or woven from side to side of the frame 22 in substantially parallel string segments 40, and from transverse side to side, wherein each string segment 40 alternately crosses over and under intersecting string segments 40. As shown in FIG., the grommet elements 30 can be assigned position numbers, arbitrarily beginning with a first grommet element 42 on the first side 50 of the frame 22. Counting counter-clockwise, the first grommet element 42 is directly across from the twenty-sixth grommet element 44. The string extends or runs in through the first grommet element 42 on the first side 50 of the frame 22, across the frame 22 to the opposite twenty-sixth grommet element 44 in the second side 52 of the frame 22, and out through that grommet element 44. Where it emerges from the twenty-sixth grommet element 44 on the second side 52 of the frame 22, it runs along the guide groove 38 on the outer side of the grommet stripe 28 to, in and through the next grommet element, which is the twenty-fifth grommet element 46. From the twenty-fifth grommet element 46, the string runs to the opposite second grommet element 48, and so forth. Where the string emerges from the last grommet element on the first side, which is the fourth grommet element 60, proximate a first corner 58 of the frame 22, it runs along the grommet-stripe guide groove 38 to the nearest grommet element on the third side 54 of the frame 22, which (continuing the counter clockwise labeling of the grommet-element positions) is the fifth grommet element 62. The course of the string back and forth between the third side 54 and its opposite fourth side 56 of the frame 22, extending in substantially parallel segments, is substantially the same as its course between the first and second sides 50, 52 of the frame 22.

The two series of substantially parallel string segments 40, that is, the set running between the first and second frame sides 50, 52, and that running between the third and fourth frame sides 54, 56, are disposed in substantially perpendicular alignment to and with each other, and each string segment 40 is woven alternately over and under the string segments 40 it crosses along its path or course between frame sides. The network or stringing formed by these crisscrossed string segments 40 are like that of a conventional tennis racket. They comprise an open network, that is, a network in which the string segments 40 are not knotted or otherwise secured at the various crossing points nor at any point on the grommet stripe 28, except of course at the strings' ends, which is discussed below.

The stringing is under tension, and in this embodiment that tension is set between about 80 and 100 psi (lb./in.$^2$). At this level of tension the platform 20 and its strung surface 24 are substantially rigid (or near rigid), retaining a very slight capacity to yield to force or strain. The yielding of the platform surface 24 under loads up to about 300 pounds is far less than 5 percent. The string sections are free to move past each other, and are free to move within the guide groove 38 and grommet elements 30 of the grommet stripe 28, although of course such movements are limited by such factors such as the set tension on the stringing, the load on the stringing, the stringing's resistance to elongation, and the like.

The grommet stripe 28 and the strings are preferably formed of materials that will not create noise when sliding past, or rubbing against, each other. In this embodiment a nylon is used for both the grommet stripe 28 and the strings. The movements of the stringing, and the attendant rubbing of string segment upon string segment and/or string segments 40 upon grommet stripe 28, are all substantially noiseless. Even if the set tension on the stringing was lowered, and the string-past-string or string-past-grommet stripe 28 movements and rubbing were therefore more pronounced, the nylon-against-nylon contact will remain substantially noiseless.

The frame body 26 is a formed of carbon graphite reinforced thermoplastic composite tubing having about a 0.06 inch wall thickness, and having a cross-section profile approaching 1 inch by 0.5 to 0.86 inch rectangle. The outside and inside walls 64, 66 of the frame-body tubing are substantially flat and parallel to each other and are about 0.5 inches long. Its upper and lower walls 68, 70 each have a horizontal extent of about 1 inch, and are bowed or arced outward from the horizontal.

The sides 50, 52, 54, 56 of the frame 22 under a low or zero load are bowed or curved, with the bow or arc of the third and fourth sides 54, 56 being distinctly more pronounced than that of the first and second sides 50, 52. In fact, the first and second sides 50, 52 of the frame 22 are substantially straight along their midsections and somewhat beyond. The first and second sides 50, 52 of the frame 22 are shorter than the third and fourth "lengthwise" sides 54, 56. (When incorporated into a treestand via connections along the first and second sides 50, 52, as is demonstrated in a treestand embodiment described below, the "width" of the platform 20 is actually from the first side 50 to the second side 52, and thus the third and forth sides 54, 56 are "widthwise" sides.) When this platform 20 is supported in an elevated position along its first and second sides 50, 52, and a reasonably significant load is placed on the stringing, the stringing will yield very slightly (again, far less than 5 percent) and the third and fourth sides 54, 56 will be drawn slightly closer together. Under such a load, the distance between the third and fourth sides 54, 56 will be lessened by a few millimeters, the configuration of the platform 20 thus becoming somewhat more rectangular. When the load on the platform 20 is removed, the frame 22 substantially returns to its original configuration.

The frame 22 in this embodiment is configured with side-to-side mirror-image symmetry. That is, the top and bottom halves (taken from the outlook of FIG. 1, which more accurately could be called the inboard and outboard halves, as discussed below) would overlap and match if the platform 20 could be folded along a bisecting line midway between its third and fourth sides 54, 56. The left and right halves would also overlap and match if the platform 20 could be folded along a bisecting line midway between the first and second sides 50, 52. With suitable connections to the other components of a treestand, the platform 20 can be detached, turned back-to-front and/or upside-down and reconnected in that posture.

The apertures through the frame body 26 are drilled or otherwise formed substantially normal to frame body's outside surface 34 at the respective point. The frame-body apertures (and also the grommet elements 30 embedded therein) therefore are not all coaxial with their respective counterpart string segments 40 when the platform 20 is under zero load. The apertures along the midsection of the substantially straight first and second sides 50, 52 of the frame 22, of course, are substantially coaxial with their counterpart string segments 40. Likewise, because the center-most sections of the frame's third and fourth sides 54, 56 extend substantially perpendicular to the string segments 40, the apertures in those regions will be substantially coaxial with the respective counterpart string segments 40 when the platform 20 is under zero load. When the platform 20 is under a material load and its configuration becomes slightly more rectangular, coaxial alignment of apertures and string segments 40 is approached.

The string segments 40 running between the first and second sides 50, 52 of the frame 22 are referred to at times herein as the "web" or "warp" strings, and those running between the third and fourth frame sides 54, 56 are referred to at times herein as the "woof" strings, although it is understood that, in this embodiment, neither set is comprised of separate strings. The spacing between adjacent warp strings is about one inch. The spacing between woof strings is also about one inch. The strings are 400 psi minimum tensile-strength nylon monofilament having a diameter of about 2.0 mm. and an elongation of about 30 to 40 percent at its tear point (that is, it will not break until about an 30 to 40 percent elongation is reached).

The grommet eyelet apertures 72 define string passages through the frame 22 and are dimensioned to receive the strings. The grommet apertures 72 generally have diameters of about 2.5 mm, although a suitable diameter could be from only slightly greater than the 2.0 mm diameter of the strings, up to about 4.0 mm or larger. Certain grommet elements, referred to herein as "tie up" grommet elements, are over-sized and more precisely are double-sized. That is, the over-sized tie-up grommet elements have eyelet diameters sufficient for the passing through of two string segments 40. One of the tie-up grommet elements is the seventeenth grommet element 76, which is on the third side 54 of the frame 22. One of the two strings that form the stringing runs across the platform 20 (from one of the grommet elements on the fourth frame side 56) in through the sixteenth grommet element 78, through the grommet stripe groove 38 to, down into and through the seventeenth grommet element 76, and then runs along the inner face of the frame 22 and is tied to itself about at the point where it enters at the sixteenth grommet element 78 (which is one of the "tie-up points"). Another tie-up point is at the eighteenth grommet element 80, the other string running from this tie-up point along the frame's inner face to, up into and through the seventeenth grommet element 76, and then through the stripe groove 38 back to the eighteenth grommet element 80, through that element 80 and then across to the opposite grommet element on the fourth side 56. Thus the string passes twice through the seventeenth grommet element 76. There is a similar second tie-up grommet element flanked by two similar tie-up points elsewhere on the platform 20.

The interstices framed by the crossing string segments 40 are openings slightly less than a square inch in configuration or surface area. The interstices formed by three of the crossing string segments 40 together with the inside of the frame 22 are generally larger, particularly along arcs of the third and fourth sides of the frame 22.

In comparison, the string of a conventional tennis racket may be a monofilament having about a 0.35 to 0.38 inch diameter, set in opposing parallel alignments, with the string segments within each alignment being spaced apart from each other about 0.5 or 0.6 inches. The midsection interstices between such strings are therefore about one-fourth of a square inch.

True transparency or at least downward visibility comparable to, or approaching, true transparency is provided by the platform 20. Similar to, or clearer than, the visibility achieved when looking through a tennis racket held a arms length, a person standing on the platform 20 can see directly through it. The visibility down through the platform 20 is clear, without any appreciable diffusion, distortion or obstruction. Objects below the platform 20 are entirely visible because there are no visibility obstructions other than the stringing. The stringing mass comprises only about 8 percent of the surface area that it covers and is formed with strings that are so thin that visibility through the platform 20 is not obstructed when viewed from a five or six feet distance, which is the approximate distance between a treestand user's head and the platform on which he is standing.

The dimensions of the platform 20 are about 22 inches by 23 inches, measured at the side centers. The platform 20 weighs about 1 lb. If it were a true rectangle, the surface 24 would be about 506 square inches or 3.5 square feet, and its weight per surface area would be about 0.28 $lb/ft^2$. Its actual surface area is smaller by about 30 square inches, and thus its weight per surface area is about 0.3 $lb/ft^2$.

Proximate each corner of the frame 22, but along only the third and fourth sides 54, 56 of the frame 22, are apertured raised sections 82 for treestand connection, which will also be discussed below in connection with the treestand embodiment of FIGS. 7 to 9. The apertured raised sections 82 are the connection sites for fastening the frame 22 to the mainframe of a treestand. It is noted at this point that the platform 20 of the embodiment of FIGS. 1 to 3 can be mounted on the mainframe of a treestand with is apertured raised sections 82 either facing upward or downward. A downward orientation of the apertured raised sections 82 has the advantages derived from having the connection point underlying the mass of frame 22 and thus in the direction of the stress or constraining force opposite and against the load on the platform 20. It is nonetheless believed that the raised apertured sections 82 are sufficiently strong to hold a connection against the downward force of a load upon the platform 20 when disposed on the upward side of the frame 22. Because the platform 20 of the embodiment of FIGS. 1 to 3 can be mounted on the mainframe of a treestand with is apertured raised sections 82 either facing upward or downward, the plan view of FIG. 1 could be considered either a top plan view or a bottom plan view of the platform 20.

Figure 4:
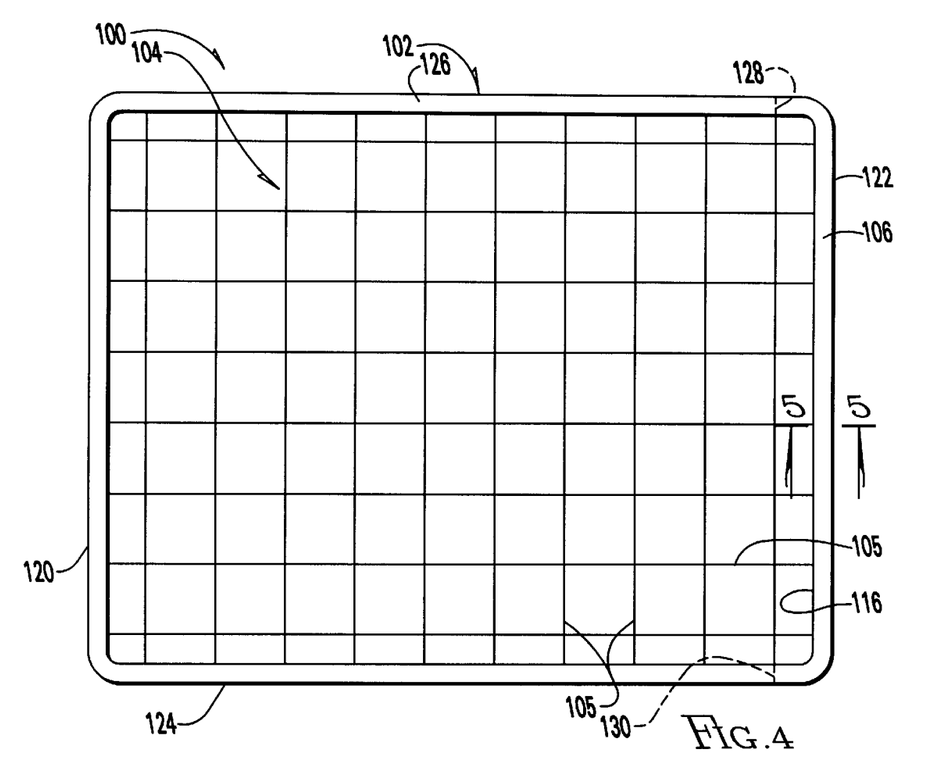
FIG. 4 is a top plan view of a platform of the invention.
Figure 5:
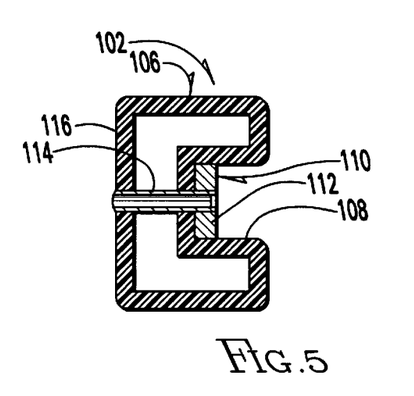
FIG. 5 is a section view of the platform of FIG. 4, taken along section line 5—5 of FIG. 4.

Referring now to FIGS. 4 and 5, there is shown an approximately 23 inch by 29 inch substantially rectangular treestand platform 100 of the present invention having a frame 102 surrounding and supporting a strung tension surface 104. The strung surface 104 is comprised of an network formed by interlaced strings 105 running from side-to-side of the frame 102. The frame 102 is comprised of a frame body 106 having an outer channel or gutter 108 in which is seated the band element 110 of a grommet stripe or strip 112. The grommet strip 112 is comprised of a plurality of elements 114 set at intervals along the elongated band element 110. The frame body 106 is perforated by a succession of apertures that extend from the center bottom of its outside channel 108 through to its inner side face 116. The grommet elements 114 of the grommet strip 112 extend through and slightly beyond such apertures. The banding of the grommet strip 112 around the frame body 106, the embedding of the grommet elements 114 in the frame-body apertures, and the seating of the grommet strip 112 within the frame body's outside channel 108 all contribute to the fixing of the grommet strip 112 in place around the frame body 106. The grommet elements 114 bush and size the apertures.

In more detail, the strings 105 of the stringing are each separate monofilaments that extend from side to side of the frame 102 in substantially parallel alignment, and also from transverse side to side, woven in and out of the strings 105 that are crossed or intersected. There are eight separate strings 105 extending between the shorter first and second sides 120, 122 of the frame 102, with three inch spaced centers, and a margin of about one inch between each lateral string 105 and the respective proximate inside corner of the frame 102. There are 10 separate strings 105 extending between the longer third and fourth sides 124, 126 of the frame 102, with three inch spaced centers, and a margin of about one inch between each lateral string and the respective proximate inside corner of the frame 102. The affixation of the separate strings 105 to the frame 102 at each end can be conveniently accomplished by stringing with one or more pieces of string material to form a plurality of string sections, and then crimping each end of each section by means of a mechanical fastener or stop, or instead typing off each end of each segment. The affixation of the string ends to the frame 102, however, can also be accomplished by most any conventional attachment method. Arbitrarily assigning the grommet element position of "first" to the right-hand lateral grommet element 128 on the fourth frame side 126, as viewed in FIG. 4, and counting the positions counter-clockwise, the first grommet element 128 is directly across from the tenth grommet element 130. The string extends or runs from the first grommet element 128 on the fourth side 126 of the frame 102, across the frame 102 to the opposite tenth grommet element 130 in the third side 124 of the frame 102, and is affixed at each end at these respective grommet elements 128, 130. The strings 105 between the first and second sides 120, 122 of the frame 102 are likewise extended and affixed.

The two series of strings, that is, the set of substantially parallel strings running between the first and second frame sides 120, 122, and that running between the third and fourth frame sides 124, 126, are disposed in substantially perpendicular alignment to and with each other, and each string segment is woven alternately over and under the strings it crosses along its path or course between frame sides. The network or stringing formed by these crisscrossed strings 105 differs from the stringing of a conventional tennis racket in that the strings are affixed at the grommet strip on either side of each segment that crosses from one side of the frame 102 to the other.

The stringing is under tension, and in this embodiment that tension is set at or higher than 110 psi. At this level of tension the platform 100 and its strung surface 104 are rather rigid, retaining little or no capacity to yield to force or strain. The crossing sections of the strings are free to move past each other, although of course such movements are extremely limited by the tension on the strings. The strings 105 can be more aptly described as rubbing against each other, rather than as moving past each other, when the platform 100 is under load.

The grommet strip 112 and the strings 105 are formed of a material having a low friction coefficient, which in this embodiment could be 3.0 mm. diameter nylon or instead for instance a substantially equivalent high tenacity polypropylene. Any rubbing of string upon string and/or against grommet strip would be substantially noiseless.

The frame body 106 is a formed of aluminum tubing having a rectangular cross-section profile except for the channel-forming indentation 108 along the outer side. The pairs of opposed walls of the frame body tubing are otherwise substantially flat and parallel to each other.

The sides of the frame 102 are substantially straight, except along the curved corner regions. When this platform 100 is supported in an elevated position and a reasonably significant load is placed on the stringing, there will be substantially no yielding of the stringing 104 nor deformation of the aluminum frame 102.

The apertures through the frame body 106 are oriented substantially perpendicular to the immediate frame body section. These apertures therefore are all substantially coaxial with their respective counterpart strings because all four frame sides are straight in the stringing area, and the strings 105 extend normal from the frame 102 at each of their ends.

The interstices framed by the crossing strings are openings slightly less than a three inch by three inch opening. The interstices formed by three of the crossing strings together with the inside of the frame 102 are generally smaller. This platform 100 also provides a transparent or close to transparent downward through-the-platform visibility.

The frame 102 can readily be provided with fastener apertures and the like mechanisms for conventional treestand connection methods.

Figure 6:
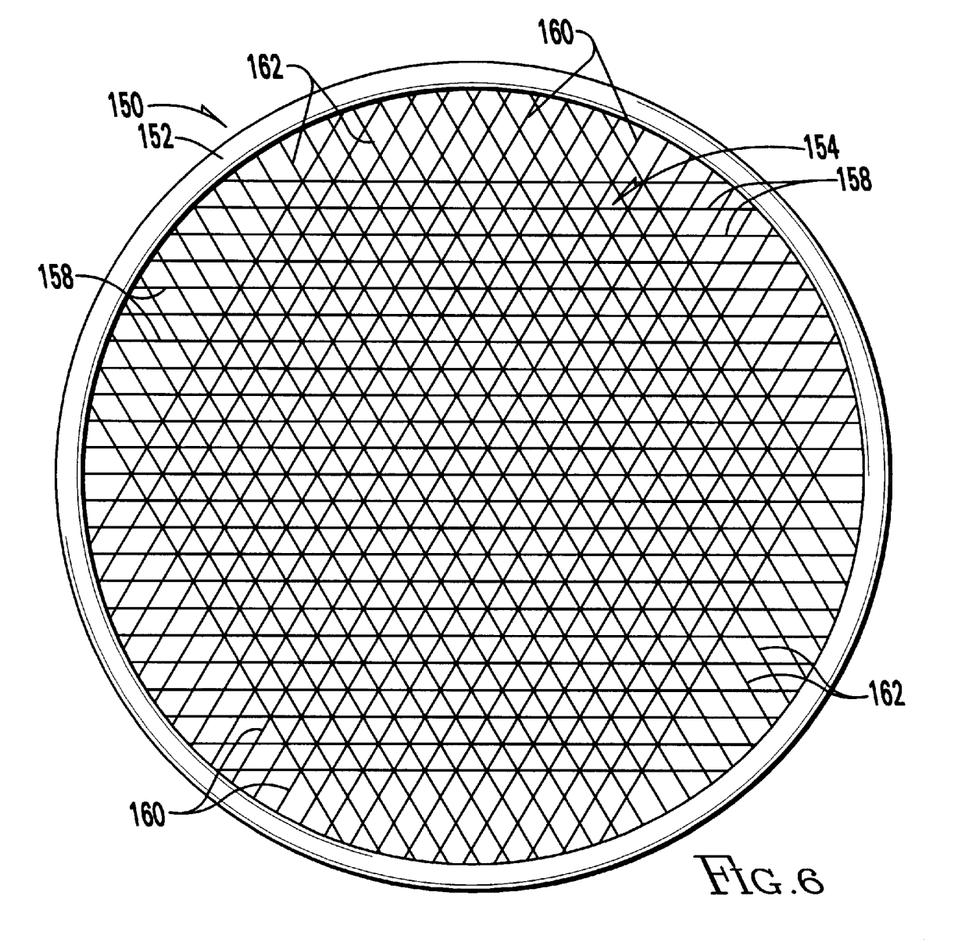
FIG. 6 is a perspective view of a platform of the invention.

Referring now to FIG. 6, there is shown an approximately 32 inch diameter, substantially round treestand platform 150 of the present invention having a substantially circular frame 152 surrounding and supporting a strung platform surface 154. The strung surface 154 is comprised of an network formed by a plurality of crossing string sections, namely a first, a second and a third string series 158, 160, 162. The frame 152 is a tubular ring having a plurality of conventional mechanical fasteners (not shown) which anchor the ends of the separate strings or string segments to the frame 152. The crossing string series 158, 160, 162 which form the stringing could be a nylon or other extrudable, synthetic monofilament or instead, for instance, a braided natural fiber cordage product. The frame body is a formed of a composite tubing having a circular cross-section profile (not shown). The strings within each string section are placed so that there is a 0.5 inch space between adjacent string centers. The strings do not alternatively cross over and under strings that are intersected, but instead the first string series 158 overlies the second string series 160, and the second string series 160 overlies the third string series 162. The strings of each of the first, second and third string series 158, 160, 162 are under a rather high tension, and all of the end mechanical attachment points are substantially within the plane of the middle, second string section 160. Thus the second string series 160 is tightly sandwiched between the first and third string series 158, 162. To further hold the string series 158, 160, 162 in close contact, one or more of the individual strings thereof could weave over and under at least some of the strings that it crosses. Other details of the embodiment of FIG. 6 are substantially the same as the platform embodiments of FIGS. 1 to 5, and thus will not be further described.

Figure 7:
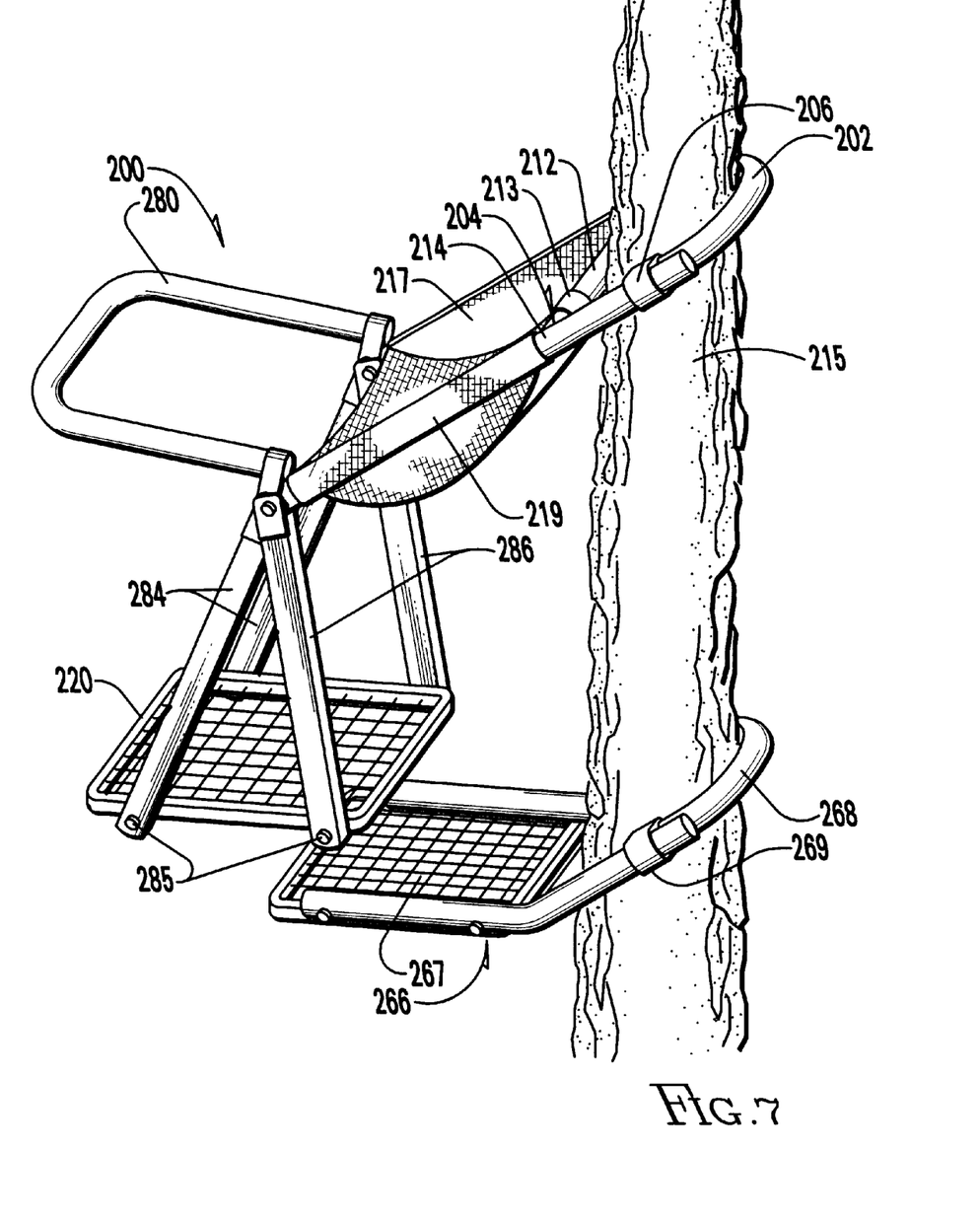
FIG. 7 is a partially-diagrammatic perspective view of a climbing treestand of the invention.
Figures 8, 9:
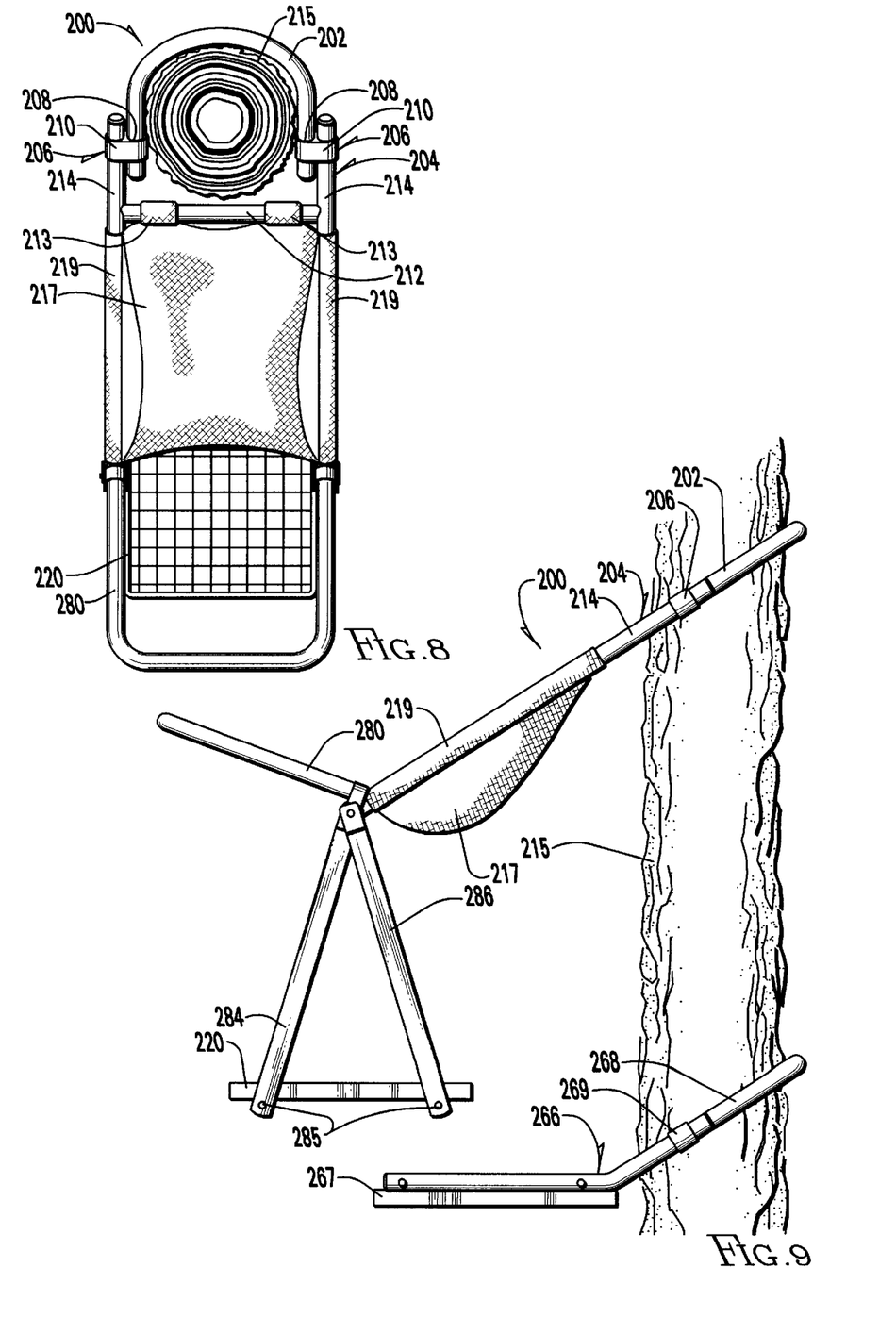
FIG. 8 is a top plan view of the climbing treestand of FIG. 7.
FIG. 9 is a side view of the climbing treestand of FIG. 7.

Referring now to FIGS. 7 to 9, there is shown a treestand 200 of the present invention. The treestand 200 includes a treestand platform 220 as described for the platform embodiment of FIGS. 1 to 3. The treestand 200 includes a tree wrap member 202 and a mainframe 204. Two clamps 206 join of the tree wrap member 202 to the mainframe 204 of the treestand 200. The tree wrap member 202 of FIGS. 7 to 9 is a substantially rigid V-bar tree-gripper terminating in substantially parallel V-bar arm sections and having a pair of V-bar apertures (not shown) proximate each end. Each V-bar end is attached along the side of its V-bar arm section to one of the clamps 206 via a flanged fastener 208 and is tightly secured thereto. The clamp 206 is conveniently joined in such manner to the V-bar tree-gripper 202 prior to use, and is conveniently carried on the V-bar tree-gripper 202 as a fixed component thereof during use. The clamp 206 includes a clamp body 210 extending from the flanged fastener 208, which clamp body 210 is movable from a slightly loosened mode to a mode in which it is clamped to a component of the mainframe as described below.

The treestand's mainframe 204 includes a wrap-closure member which, in this embodiment, is comprised of a crossbar 212 flanked by two substantially parallel, spaced frame-arm sections 214. The combination of the V-bar, crossbar 212 and two spaced frame-arm sections 214 form the tree surround sector that encircles a tree 215 or other vertical columnar support. The separable tree wrap member 202, together with the wrap-closure member (the crossbar 212 and two frame-arm sections 214), also are normally the primary components that grip and embrace the tree 215, holding and/or supporting the treestand's mainframe 204 in an elevated position thereon. The optimal distance between the crossbar 212 and the V-bar 202 is slightly more than the diameter of the selected tree 215 so that when the mainframe 204 is hung gripping the tree at somewhat downward orientation. When first hooked around the tree near the tree base, an angle of about 20° from normal relative the tree or somewhat more is a good starting selection. The present invention permits the joinder of the V-bar 202 to the mainframe 204 by simply sliding the clamp 206 over and along one of the frame-arm sections 214 (and performing the same step on the opposite side with the second clamp 206) until the desired distance between V-bar 202 and crossbar 212 is reached. Since the tree surround sector will at this time actually surround the selected tree 215, the appropriate spacing can be gauged or estimated merely from the snugness of the fit around the tree 215. When the clamp 206 is positioned on the frame-arm section 252 at the desired location, the clamp body 210 is tightened merely by tightening the single clamp fastener at the clamp's fastener side (not shown). Such clamp fastener is already in place, and only slightly loosened, so its tightening only requires a twist.

The frame-arm sections 214 are formed of tubes that substantially conform to the configuration of the clamp body orifice (not shown) and substantially fill its entire space.

The treestand 200 illustrated in FIGS. 7 to 9 is a climbing treestand. The treestand 200 has a mainframe 204 that is similar in style features to that described in U.S. Pat. No. 5,685,395, Nov. 11, 1997, Nelson, the disclosures of which are incorporated hereinto by reference. A mesh bag 217 whose sides are attached to the frame arm sections 214 and crossbar 212 is a seat component of the treestand 200. The bag 217 is attached to the crossbar 212 via a plurality of straps 213. The bag 217 is attached to the frame arm sections 214 via the bag's open-ended side pockets 219 through which the arm sections 214 outboard of the crossbar 212 extend. This attachment arrangement conveniently permits the bag 217 to be conveniently pushed up towards the crossbar 212 when climbing, when attaching/detaching the stand 200 from a tree, and when standing on the platform 220. The platform 220 is connected to, and supported off, the distal ends of the frame arm sections 214, and thus is supported in a position spaced from the tree, rather than being separately attached to, or abutting, the tree. A foot climber 266 is also generally shown. The foot climber 266 is a separate unit that functions as a climbing aid to the primary stand unit. The foot climber 266 has its own wrap-closure member 267 which forms a tree surround sector with a tree wrap member 268 in a similar manner as the main tree surround sector. The foot climber 266 is a supporting means only during the ascent and descent when the user is moving the main unit, and of course its tree surround sector, to a higher or lower level. Briefly, for the ascent, the user (1) stands erect, between the frame arm sections 214 and facing close to the tree, on the cross-piece 269 of the foot climber 266, (2) lifts the main unit upwards to a higher attachment position, (3) sits on the platform 220 and drags the foot climber 266 to a higher attachment position (which of course will continue to be beneath the main unit's attachment position). The foot climber 266 might be dragged up by the user's feet, or instead by the expedient of pulling it up with a safety line (not shown) attached to both the foot climber 266 and main unit, to avoid accidental downward slippage of the foot climber 266. The foot climber's clamp, or more precisely pair of clamps 269, are prefastened to the tree wrap member 268 and slide on and tighten about a set of tubular members in the same manner as is described above, and thus provide the same advantages of the present invention as described above. For simplicity, the details are neither illustrated nor described herein. The treestand 200 also includes an encircling U-shaped rail bar 280 that functions as a protective rail when the user is standing on the platform 220, and can function as a convenient foot rest when the user is seated within the bag seat 217. The platform 220 is supported off the arm sections 214, and spaced from the tree 215, by a pair of dual struts 284, 286 on each side of the platform. Each of the struts 284, 286 are connected to the platform 220 by a bolt 285 which runs through the aperture of an apertured raised section on the platform's frame (not shown but shown and described regarding the platform of FIGS. 1 to 3), which raised sections are oriented downward.

Figure 10:
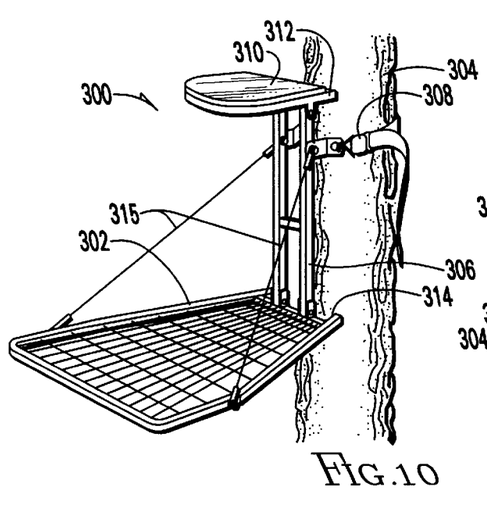
FIG. 10 is a perspective view of a fixed-position treestand of the invention.
Figure 11:
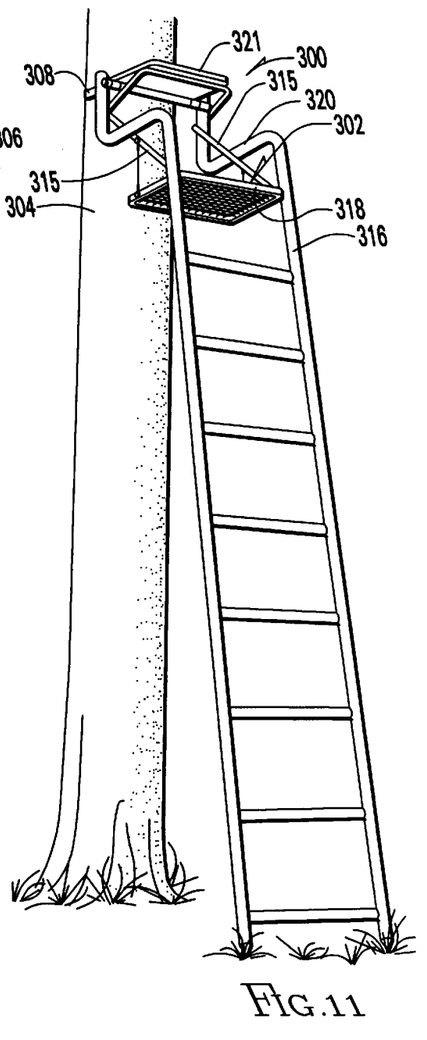
FIG. 11 is a perspective view of a ladder treestand of the invention.
Figure 12:
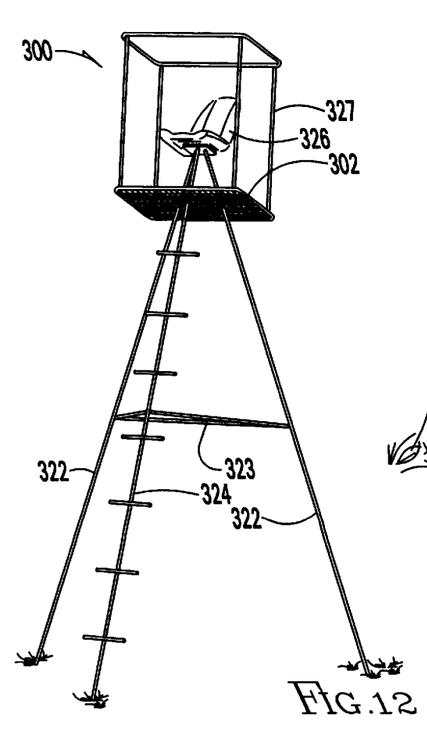
FIG. 12 is a perspective view of a self-supporting, multi-legged treestand of the invention.

Referring now to FIGS. 10 to 12, there are shown three other types of treestands of the present invention. Similar components will be designated with the same reference numbers for simplicity in FIGS. 10 to 12 and this description thereof. As true for the climbing treestand shown in FIGS. 7 to 9, these devices are elevated or aerial observation platforms useful for activities in which it is desirable to be undetected by wildlife or persons below. Such structures can of course also be used indoors when desired. Each of these stands 300 includes a strung platform 302 like those of the embodiments of FIGS. 1 to 9. The platform 302 of each of these treestands 300 is designed to support the user in a standing position. The platforms shown in FIGS. 10 and 11 are adapted to extend out from the tree 304 or other structure on which the stand 300 is mounted in an at least proximate horizontal orientation. The platform 302 shown FIG. 12 is supported in a substantially horizontal position, but on a self-supported, multi-legged treestand 300.

The treestand 300 of FIG. 10 is a fixed-position stand, which as shown includes a bifurcated mounting frame 306, a strap 308 secured thereto for attaching the treestand 300 at an elevated position on a tree trunk 304, and a small seat 310 supported on a horizontal frame 312 extending from the mounting frame 306. The seat 304 is positioned above the attachment strap 308, and also directly above the strung platform 302. The strung platform 302 is also supported from above via a pair of struts 315. The inboard edge of the strung platform 302 is spaced apart slightly from the tree 304 by a pair of rigid spacing pins 314.

The treestand 300 of FIG. 11 includes an integrated rung ladder-type component 316 for climbing up and down from the stand's strung platform 302, and thus this treestand 300 is a ladder stand. The ladder component 316 is attached to the strung platform 302 at the platform's "outboard" edge 318, that is the edge opposite the one that abuts or is positioned near to the tree or other supporting structure. The ladder component 316 provides the means to ascend and descend from the strung platform 302 and also functions as a support leg, bearing some of the weight of the stand 300, of the user and of his equipment. The strung platform 302 is also supported from above via a pair of struts 315. This treestand 300 has side rails 320 above the strung platform 302 and a seat 321, and includes a strap 308 to secure it to the tree 304.

The self-supporting treestand 300 of FIG. 12 is a tripod stand. It has a plurality of elongated pole-style support legs 322 plus ladder-type support leg 324, all of which are splayed down and out from the elevated strung platform 302 on which is mounted a swivel chair 326. Cross-braces 323 run between adjacent support legs 322, 324, and a framework 327 for supporting a blind is mounted around the chair 327 on the strung platform 302.

As discussed in the "Background of the Invention" section hereof, many platforms of commercial stands are formed with ribs, slats or rods held within perimeter frames, which constructions provide some weight-savings and some degree of downward viewability. The ribs and the like of such platforms are normally spaced-apart at least about 1.5 inches or more, because without such a wide gap no weight and/or viewability advantages of any significance would be realized. The gaps in such constructions therefore are at least about 15 inches long by 1.5 inches wide or larger. Such gaps are large enough to have the heel of a boot, or even a child's foot, caught in them. These types of very dangerous occurrences are not unknown. In addition, there are numerous pieces of equipment used in treestand activities that could easily fall through such gaps, including pens, pencils, notebooks, rolls of film, watches, stopwatches, firearm ammunition, arrows, and the like. In contrast, the weight-savings and downward viewability provided by the present invention far surpasses that achieved by these cross-ribbed and the like constructions, which is demonstrated in detail in the various Examples below, without the dangers arising from the presence of large gaps in the surface of a treestand's platform. As seen in the embodiment of FIGS. 1 to 3, which is a preferred embodiment of the invention, the openings in the platform surface are generally slightly less than an inch square. That is far two small to have a boot heel or child's foot caught in an opening. It is also too small for anything but the smallest of objects to fall through. Even the openings approaching three by three inches of the embodiment of FIGS. 4 and 5 are too small to catch a child's foot or boot heel, or to pose any material risk of equipment falling through. The differences in size and configuration of the openings also impact comfort and security. The platform of the present invention feels comfortable and solid underfoot. The user's perception is that he is standing on a platform that approaches being a solid platform, and the platform approaches the safety and comfort characteristics of a solid platform, including easing exposure discomfort, without its weight and lack of downward viewability disadvantages.

In preferred embodiment, the strings sections of the stringing are set apart by no more than a distance of about 3.0 or 3.5 inches measured from string centers (the distance between the centers of adjacent string segments). Although there is no actual minimum string center positioning, there is little to no advantage in a string center setting at less than about 0.5 or 0.4 inches. And there are disadvantages when the string segments are set very close to each other, including without limitation (a) the decline in the downward visibility, (b) the weakening of the perimeter frame due to the increased number of apertures (or other types of fasteners) and the decreased distance between them, (c) a possibly needless weight increase, and (d) increased material and production costs.

In preferred embodiment, the diameter of the string is no more than about 5 or 5.5 mm. The selection of string diameter raises considerations generally opposite to that of string-center settings discussed above. For a given string-center setting, (a) the downward visibility, and (b) the strength of the frame (in apertured constructions) vary inversely with string diameter, and (c) the platform weight and (d) the material and production costs vary directly with string diameter. The selection of string material of less than about 1.6 or 1.5 mm diameter would be practical only if such slender stringing met reasonable tensile strength minimums.

It is believed that the tensile strength of the string itself can be as low as 200 psi, or even less given other parameters of the stringing, although string of at least about 300 or 350 psi would provide a wide safety margin. String of lesser tensile strength might nonetheless provide wide safety margins when, for instance, used in a tightly woven stringing, or in a treestand designed and/or rated for low load levels, such as the 150 pound limit treestands designed for use by light-weight women or children.

It is well within the skill of a person in the technical field, upon becoming conversant with, or otherwise having knowledge of, the present invention, to select suitable combinations of string, string-center settings and the like in view of the type of platform and/or treestand being designed and/or constructed.

It is also well within the skill of a person in the technical field, upon becoming conversant with, or otherwise having knowledge of, the present invention, to select suitable materials for the stringing, the grommet strip, the frame and the like in view of the type of platform and/or treestand being designed and/or constructed. A slender monofilament having a high tensile strength, and a suitable degree of rigidity under tension, such as the nylon described above in the embodiments of FIGS. 1 to 12, is a preferred selection for the stringing because its provides a high loading strength at reasonable tensions, string-center settings, and string diameters, which in turn provide downward viewability at least approaching transparency, in a platform that is essentially noiseless. Such a nylon monofilament could of course also be a fiber-reinforced nylon monofilament, such as a carbon fiber reinforced nylon monofilament. And nylons of these type are common commercially-available materials. There are, however, countless other materials that can be used instead of a nylon of the types described. Further, the stringing material need not be a monofilament, and instead could be a multi-filament, twisted, plaited, braided or other combinations, unifications or integrations of filaments, fibers and/or other materials. The composition may be a synthetic filament, multi-filament or fibrous product, such as Kevlar (Kevlar is a registered trademark of the DuPont Company), nylon, polypropylene, polyester, aramid, polycarbonate, acrylic, urethane, and blends, co-extrusions and other combinations thereof. It may be formed from a semi-synthetic material such as rayon or viscose rayon, or from natural materials including silk, cotton, wool, jute, hemp, flax, manila. It may be fabricated from composites, including glass fiber composites and carbon resin composites, and blends thereof with other materials. It may be coated. It may be formed or partly formed of metal, including without limitation carbon steel fibers, stainless steel fibers, bronze fibers, and aluminum fibers, or it might be metal filaments, strands or wires, and the like or blends of metal and other materials, such as metalized polyesters. It could be formed of copolymers, alloys and/or blends, and be formed as flat or tubular monofilaments, ribbons, narrow cords or other cordage products. It can, and at times should, be treated or include additives to ameliorate any deterioration, or other deleterious effects, from prolonged exposure to outdoor environmental conditions, such as U.V. inhibitor additives in nylon monofilaments and the like.

If a material does not have the desired tensile strength or diameter or the like, techniques are well known to boost such factors, such as "bundling" by twisting, plaiting and the like (very old and well known techniques), the inclusion of additives, fabrication of composite string materials, and the multitude of other fabrication methods.

Similarly the frame can be formed of light-weight materials such as aluminum, resin/fiber composites, magnesium, magnesium alloys, and the like, or more heavy-weight materials such as steel, iron, and the like. The frame can be formed as a tubing, or can be solid. Certain selections might lead to less than optimal results, such as the use of metal wires or cables which, if not suitably coated or sheathed or the like, probably would be somewhat noisy, but nonetheless could provide some of the other considerable advantages of the present invention, and therefore such materials are not excluded from the present invention. Further, there could well be materials and/or combinations of materials not mentioned herein which, when used in the present invention, enhance one or more of the advantages as described herein, and the use of such materials is also not excluded from the present invention.

The stringing need not be run through apertures along the frame, and instead the supporting attachment could be provided by conventional means such as wrapping, tying, or any other attachment means, provided the resultant platform and/or treestand has the desired load capacity.

The stringing can formed from a single continuous string, two strings, or many strings. The stringing can be formed of a single material and fabrication, or can be formed of a plurality strings formed of different materials and/or having different fabrication constructions. For instance monofilaments and multi-filament cords can be used together to form the stringing. The string-center distance can be uniform or vary across the plane of the platform. The intersections between crossing strings need not be normal, and instead stringing pattern in which the strings cross at acute and obtuse angles and combinations of varying angles can be selected. The individual strings of a given string section need not lie parallel to one another nor have regular center spacings. Instead, for instance, a section of strings can fan out in a radial pattern, and/or have irregular center spacings. The strings might not weave alternatively over and under the strings it crossing, and instead might weave over and under just some of them, or groups of them, or none of them. The possible stringing patterns are virtually unlimited.

In preferred embodiment, there is no more than about a 4 or 5 percent yield or deformation (as measured by either increased surface area and/or by a linear dimension increase) of the stringing upon about a 200 or 300 pound loading, and preferably no more than 2 percent yield or deformation, same basis. Generally and preferably when a 200 or 300 pound loading is placed upon the stringing the yielding or give of the stringing is far less that 4 or 5 percent, and in fact the degree in which the stringing gives is barely visible to the naked eye. That yielding could be the elongation of substantially straight filaments themselves or the further physical stretching and straightening of a multi-filament or fiber combination, such as braids, plaits and the like. In preferred embodiment, the stringing is formed of substantially flexible but not highly elastic strings under tension, whereby the substantial rigidity or near rigidity of the platform is derived in significant part from the tension on the stringing. In preferred embodiment, there is a sufficient tension on the stringing, and the stringing is formed of sufficiently nonelastic material that the stringing and the platform provide a substantially firm footing when under a loading up to about at least a 200 or 300 pounds. In preferred embodiment, there is a sufficient tension on the stringing, and the stringing is formed of sufficiently nonelastic material that the stringing on the platform provides a substantially planar surface when under a loading up to about at least a 200 or 300 pounds. This degree of resistance to deformation provides a preferred tension surface of the present invention. A preferred tension surface of the platform of the present invention can be defined as a surface formed of material that is substantially flexible until placed under tension, and one that is under sufficient tension so that at least about a 200 or 300 pound loading can be supported without substantial deformation from a planar configuration. A preferred tension surface of the present invention is a platform surface made substantially rigid, or near rigid, by tension.

The terms "stringing" and "strings" as used herein is not limited to the types of material used for sport racket strings, and include reasonably narrow metal cables, braided cotton fibers, twisted cordage, and combinations of any of the types of materials and fabrications mentioned above and any other materials and fabrications that have sufficient rigidity under tension and tensile strength for the purposes of the present invention. These terms are also not limited either to a single continuous string nor a plurality of strings.

EXAMPLE 1 AND COMPARATIVE EXAMPLES A TO V

By this Example 1 the weight savings attained when a platform of the present invention is incorporated into a conventional treestand model, converting the treestand to a treestand of the present invention, is demonstrated. Also demonstrated is that the platform of the present invention does not have a deleterious effect on treestand strength. The various measured and calculated weight parameters of the platform and treestand of Example 1 ("Ex. 1") are set forth below in Table 1. The same type of weight parameters were then determined and calculated for twenty-two different commercially-available treestand models marketed by nine different well known U.S. treestand and/or outdoor-equipment companies. The weight parameters for these Comparative Examples A to V are also shown below in Table 1. These Comparative Examples are limited to current models of well known, and some of the largest, U.S. treestand companies, for example including treestands of API Outdoors Inc. of Tallulah, La., of Warren & Sweat Manufacturing Co., Inc. of Grand Island, Fla., and of L&L Enterprises, Inc. ("OL' MAN" treestands) of Hattiesburg, Mass. The information on platform surface dimensions ("size"), platform weight ("$W_P$") and total treestand weight ("$W_T$") was measured for Example 1, and was supplied by the respective companies for the comparative examples. The platform of the Example 1 treestand is the platform described above in detail regarding, and shown in, FIGS. 1 to 3. The values of each platform's weight per unit surface area ("$W_{W/A}$") and percentage of the total treestand weight that is contributed by its platform ("$W_{P/T}$ %") are calculated values, determined from the measured or source-company values. Variants due to platform configurations other than rectangular were not considered, and any error therefrom would be insignificant. Also shown in Table 1 are the load ratings ("L-Rating") of the various treestands, which for the Comparative Examples was provided by the respective companies, and for Example 1 was determined for the treestand embodiment of FIGS. 7 to 9.

TABLE 1

| Ex. & Comp. Ex. # | Treestand Type | Platform Size (inches) | $W_P$ (lb.) | $W_{W/A}$ (lb/ft²) | Treestand $W_T$ (lb.) | $W_{P/T}$ (%) | L-Rating (lb.) |
|---|---|---|---|---|---|---|---|
| 1 | climbing | 22 × 23 | 1 | 0.28 | 25 | 5 | 300 |
| A | climbing | 20 × 23 | 9 | 2.79 | 17 | 41 | 350 |
| B | climbing | 17 × 29 | 11 | 3.24 | 24 | 46 | 250 |
| C | climbing | 21 × 34 | 13 | 2.61 | 26 | 50 | 275 |
| D | climbing | 17 × 29 | 12 | 3.51 | 18 | 67 | 250 |
| E | climbing | 20 × 29 | 13 | 3.24 | 20 | 65 | 300 |
| F | climbing | 20 × 20 | 17 | 6.12 | 29 | 59 | 300 |
| G | climbing | 18 × 32 | 13 | 3.24 | 22 | 59 | 250 |
| H | climbing | 18 × 32 | 14 | 3.51 | 23 | 61 | 250 |
| I | climbing | 24 × 42 | 15 | 2.16 | 26 | 58 | 400 |
| J | climbing | 17.5 × 30 | 10 | 2.70 | 22 | 45 | 275 |
| K | climbing | 18 × 20 | 16 | 6.39 | 27 | 59 | 300 |
| L | climbing | 18.5 × 22 | 13 | 4.59 | 21 | 62 | 260 |
| M | climbing | 20 × 20 | 12 | 4.32 | 21 | 57 | 300 |
| N | climbing | 21 × 31 | 18 | 3.96 | 28 | 29 | 300 |
| O | fixed position | 19 × 17 | 4.5 | 2.01 | 7 | 64 | 250 |
| P | fixed position | 22 × 28 | 7.5 | 1.75 | 10 | 75 | 350 |
| Q | fixed position | 21 × 21 | 11 | 3.59 | 17 | 65 | 300 |
| R | fixed position | 20 × 30 | 10 | 2.40 | 18 | 56 | 350 |
| S | fixed position | 20 × 30 | 6.5 | 1.56 | 11 | 59 | 300 |
| T | fixed position | 20 × 30 | 7 | 1.68 | 14 | 50 | 275 |
| U | fixed position | 18 × 23.5 | 6.5 | 2.21 | 9.5 | 68 | 350 |
| V | fixed position | 21 × 32 | 8.5 | 1.82 | 14.5 | 59 | 300 |

EXAMPLES 2 TO 23

In Examples 2 to 23 the total treestand weight of the commercial treestands of Comparative Examples A through V (as shown above, listed in the same order) were each compared to the same treestand model as it would be when it was converted to a treestand of the present invention. The conversion to a treestand of the present invention employed here was via a calculation of the converted platform weight by theoretical substitution of a like size platform of the present invention having a $W_{W/A}$ value of 0.28 pounds per square foot. The 0.28 lb/ft² value is the value determined for Example 1 above. As an illustration of this calculation, using the treestand of Comparative Example G (as is done in Example 8), the substitution is the removal of its thirteen pound, 18×32 inch platform having a weight per unit area value of 3.24 lb/ft², and the addition of a like size platform, namely an 18×32 inch platform, that has a $W_{W/A}$ value of 0.28 lb/ft². Again the 0.28 value is the weight per unit area value demonstrated for Example 1 above. The platform ofthis converted treestand, which converted treestand is otherwise comparable to Comparative Example G, weighs 1.12 pounds, and the converted treestand weighs only 10 pounds. Since its pre-conversion weight was 22 pounds, the conversion achieved a weight savings of 45.5%. Since the weight information supplied by the source companies are reasonably presumed to be approximations only, the ultimate weight of the treestands of Examples 2 to 23 are reported in Table 2 below without fractions of pounds. Also shown in Table 2 is the weight savings of each treestand when it was converted to a treestand of the present invention.

TABLE 2

| Ex. No. | Platform Size (in.) | Total Treestand Weight ("$W_T$") (lb.) | | Conversion Weight Savings (%) |
|---|---|---|---|---|
| | | Pre-Conversion | Post-Conversion | |
| 2 | 22 × 23 | 17 | 9 | 52.9 |
| 3 | 20 × 23 | 24 | 13 | 54.2 |
| 4 | 17 × 29 | 26 | 14 | 53.8 |
| 5 | 21 × 34 | 18 | 7 | 38.9 |
| 6 | 17 × 29 | 20 | 8 | 40.0 |
| 7 | 20 × 29 | 29 | 13 | 44.8 |
| 8 | 20 × 20 | 22 | 10 | 45.5 |
| 9 | 18 × 32 | 23 | 10 | 43.4 |
| 10 | 18 × 32 | 26 | 13 | 50.0 |
| 11 | 24 × 42 | 22 | 13 | 59.1 |
| 12 | 17.5 × 30 | 27 | 12 | 44.4 |
| 13 | 18 × 20 | 21 | 9 | 42.9 |
| 14 | 18.5 × 22 | 21 | 10 | 47.6 |
| 15 | 20 × 20 | 28 | 11 | 39.3 |
| 16 | 19 × 17 | 7 | 3 | 43 |
| 17 | 22 × 28 | 10 | 4 | 40 |
| 18 | 21 × 21 | 17 | 7 | 41 |
| 19 | 20 × 30 | 18 | 9 | 50 |
| 20 | 20 × 30 | 11 | 6 | 54 |
| 21 | 20 × 30 | 14 | 8 | 57 |
| 22 | 18 × 23.5 | 9.5 | 4 | 42 |
| 23 | 21 × 32 | 14.5 | 7 | 48 |

EXAMPLE 24 AND COMPARATIVE EXAMPLE W

The platform of the present invention is shown by this Example 24 to provide a greater weight savings than like-sized platforms formed wholly of resin and fiber composites. The platform of this Example 24 is the same 22 by 23 inch strung platform of the climbing treestand of Example 1, which has a light-weight composite frame and a strung surface. Comparative Example W is a 20 by 23 inch open-work composite platform prototype. This prototype composite platform was fabricated with open spaces between slat-like regions, and thus somewhat resembles a cross-ribbed platform. About 40 percent of the area within the prototype platform's perimeter is open, and the platform weighs about 3.5 pounds. As discussed above, the platform of Example 1's climbing tree stand, although it measures 22 by 23 inches at its longest dimensions, only approaches a rectangle, and its actual surface area is only about 90 percent of a 22 by 23 inch rectangular platform. The open or interstitial area is about 90 percent of the surface area, and the solid portion is only about 10 percent of its surface area. While its weight per surface area, $W_{W/A}$, is an extremely low 0.3 lb/ft², its weight per solid portion of its surface area ("$W_{W/SSA}$") is 10 lb/ft². In contrast, the prototype composite platform of Comparative Example W has a more than three times higher 1.0 $W_{W/A}$ value despite its vastly lower 1.7 $W_{W/SSA}$ value. (The $W_{W/SSA}$ value can be calculated by dividing the $W_{W/A}$ value by the numerical portion of the platform's surface that is solid, which for Comparative Example W would be the 1.0 value divided by 0.60.)

A treestand, and particularly its platform element, must securely hold the weight of at least one person and his equipment and supplies, such as photography or hunting equipment, and often heavy gear such as hiking or hunting boots. Recently the U.S. treestand market has seen the introduction of stands designed only for use by light weight persons, such a treestands having load ratings of only about 150 pounds. These stands are designed to be more easily used by persons having a body weight significantly less than 150 pounds, which would include a material number of women and children. The treestands of the present invention of course include treestands with low load ratings, such as load ratings of 150 pounds. The lightweight platforms of the present invention are well suited to otherwise light-weight stands, making any commercial model even lighter. A general purpose treestand, however, is one that has a load rating of at least about 250 pounds. As shown in Table 1 above, among the twenty-two representative models of commercially-available treestands, all have at least a 250 pound load or capacity rating, and the majority have a load rating between 250 and 300 pounds.

EXAMPLE 25

The percentages of voids in the planar surface area delimited by the frame of the platform embodiments illustrated in, and described regarding, FIGS. 1 to 3, 4 to 5 and 6 was determined. The embodiment of FIGS. 1 to 3 has 2 mm diameter strings (which is about a 0.08 inch diameter) set at one inch center spacing. A one inch square section centered on an interstice will encompass, in cross-section, four one-inch lengths of string half-sections or about 0.16 square inches of string cross-section. The void area thus would be about 84 percent where the interstices are defined by four strings, and the void area is larger where the interstices are defined by three strings and the frame. The total void area of inter-frame planar surface area thus is slightly greater than 84 percent. By like calculation it was determined that in the platform embodiment of FIGS. 4 to 5, which has 3 mm diameter strings (about 0.12 inch diameters) forming about three by three inch sections, the total void area of inter-frame planar surface area is slightly greater than 92 percent. By like calculation it was determined that in the platform embodiment of FIG. 6, which has 1.5 mm diameter strings (about 0.06 inch diameters) forming about 0.5 by 0.5 inch sections, the total void area of inter-frame planar surface area is slightly greater than 76 percent.

The composite of the frame 22 of the platform 20 of FIGS. 1 to 3 is formed of a thermoplastic resin reinforced with carbon fiber. The carbon fiber if of the "TORAYCA" Prepreg P305 type, the prepreg (fiber that is pre-pregnated with resin) grade P305, UD-PPG, the carbon fiber of the "TORAYCA" type T300, with Matrix Resin #2500. (Matrix resin #1200 has a specific gravity of about 1.22.) The fiber properties are: tensile strength of 360 kg/mm², tensile modulus of 23,500 kg/mm², elongation of 1.5 and a density of 1.76 g/cm³. The laminate's properties are: at 0° fiber orientation, tensile strength of 180 kg/mm², tensile modulus of 14,000 kg/mm², and tensile strain of 1.3%; at 90° fiber orientation, tensile strength of 8.0 kg/mm², tensile modulus of 900 kg/mm², and tensile strain of 1.0%; and, at 0° orientation, a compressive strength of 140 kg/mm², a compressive modulus of 13,000 kg/mm², a flexural strength of 170 kg/mm², a flexural modulus of 12,000 kg/mm², and an I.L.S.S. of 10 kg/mm². All of the properties listed above are as measured at ambient room temperature. This type of composite is available with a resin content of from about 36 to about 40 weight percent.

The present invention provides a treestand platform which comprises a near rigid frame and stringing supported on the frame. The stringing preferably is formed of a plurality of string sections, each having a plurality of strings. The strings within any of the string sections preferably are spaced apart no more than a distance of about 3.0 or 3.5 inches measured from string centers. The diameter of the strings preferably is no more than about 5 or 5.5 mm, and the strings preferably have a tensile strength of at least about 300 or 350 psi.

The treestand platform's stringing preferably has no more than about a 4 or 5 percent yield, as measured by increased surface area, upon about a 200 pound loading on the platform, and even more preferably has no more than about a 4 or 5 percent yield, as measured by increased surface area, upon about a 300 pound loading on the platform. Preferably the stringing is formed of substantially flexible strings under tension, whereby a substantial or near rigidity of the platform is derived in significant part from the tension of the strings of the stringing.

The treestand platform preferably has a weight per unit surface area ("$W_{W/A}$") of no more than about 1 pound per square foot, and even more preferably of no more than about 0.5 pound per square foot.

The present invention also provides a treestand platform which comprises a perimeter frame supporting a tension surface. The tension surface preferably is comprised of an network formed by a plurality of crossed string segments. The tension surface is also preferably comprised of interlaced string segments running from side-to-side of the frame.

The treestand platform advantageously is one with a frame comprised of a frame body girdled by a grommet strip. The grommet strip can be comprised of an elongated grommet band element and a plurality of grommet elements which bush and size apertures within the frame. The tension surface then preferably is comprised of strings strung from side to side, and from transverse side to side, of the frame in substantially parallel string segments. The string segments preferably alternately cross over and under a plurality of intersecting string segments, and at least some pass through grommet elements of the grommet strip.

The present invention provides a treestand platform wherein the perimeter frame delimits an inter-frame area, and wherein the tension surface is comprised of a plurality of elongated elements running across the inter-frame area. The planar surface area of the inter-frame area preferably is comprised of at least about 75 percent interstitial void area, and more preferably at least about 85 percent interstitial void area.

The present invention also provides a treestand which comprises a platform and means for supporting the platform in an elevated position, wherein the platform is a strung platform. The treestand might further include a seat adapted to be positioned at a higher elevation than the platform when the treestand is supported in a normal elevated position. The treestand generally is a climbing treestand, a fixed-position treestand, a ladder treestand, or a self-supporting treestand. The platform preferably is comprised of stringing having interstices defined by four segments of the stringing no larger in planar surface area than 9 square inches, and more preferably no larger in planar surface area than 3 square inches.

The present invention also provides a treestand wherein the strung frame is comprised of a frame body have a succession of bushed apertures and a plurality of strings forming a stringing supported by the frame. Preferably the strings and the interior of the bushed apertures are formed of nylon or of a material that provides a material contact noise at least approaching the noiselessness provided by nylon.

The above described embodiments are exemplitive, and the terminology is employed for illustration purposes and not limitation purposes. The present invention is not limited to the combinations and subcombinations illustrated herein.

I claim:

1. A treestand comprising:
   a standing platform;
   a seat adapted to be positioned at a higher elevation than said platform when said treestand is supported in a normal elevated position; and
   means for supporting said platform in an elevated position,
   wherein said platform is a strung platform including a surface of stringing,
   wherein said stringing is formed of substantially flexible and crossed strings under tension, and
   whereby a substantial or near rigidity of said platform is derived in significant part from said tension of said strings of said stringing.

2. The treestand of claim 1 wherein the treestand is a climbing treestand, a fixed-position treestand, a ladder treestand, or a self-supporting treestand.

3. The treestand of claim 1 wherein said stringing has interstices defined by four segments of said stringing no larger in planar surface area than 9 square inches.

4. The treestand of claim 1 wherein said stringing has interstices defined by four segments of said stringing no larger in planar surface area than 3 square inches.

5. The treestand of claim 1 wherein said strung platform is comprised of a frame body having a succession of bushed apertures and said stringing is supported by said frame body, and
   wherein said strings and the interior of said bushed apertures are formed of nylon or of a material that provides a material contact noise at least approaching the noiselessness provided by nylon.

6. The treestand of claim 1 wherein said strings run from side to side, and from transverse side to side, of said surface of stringing and form a crosshatch of crossing sets of parallel strings.

* * * * *